April 15, 1969     H. C. JUCKER     3,438,736
GRAVIMETRIC TITRATION PROCESS AND APPARATUS THEREFOR
Filed April 13, 1966
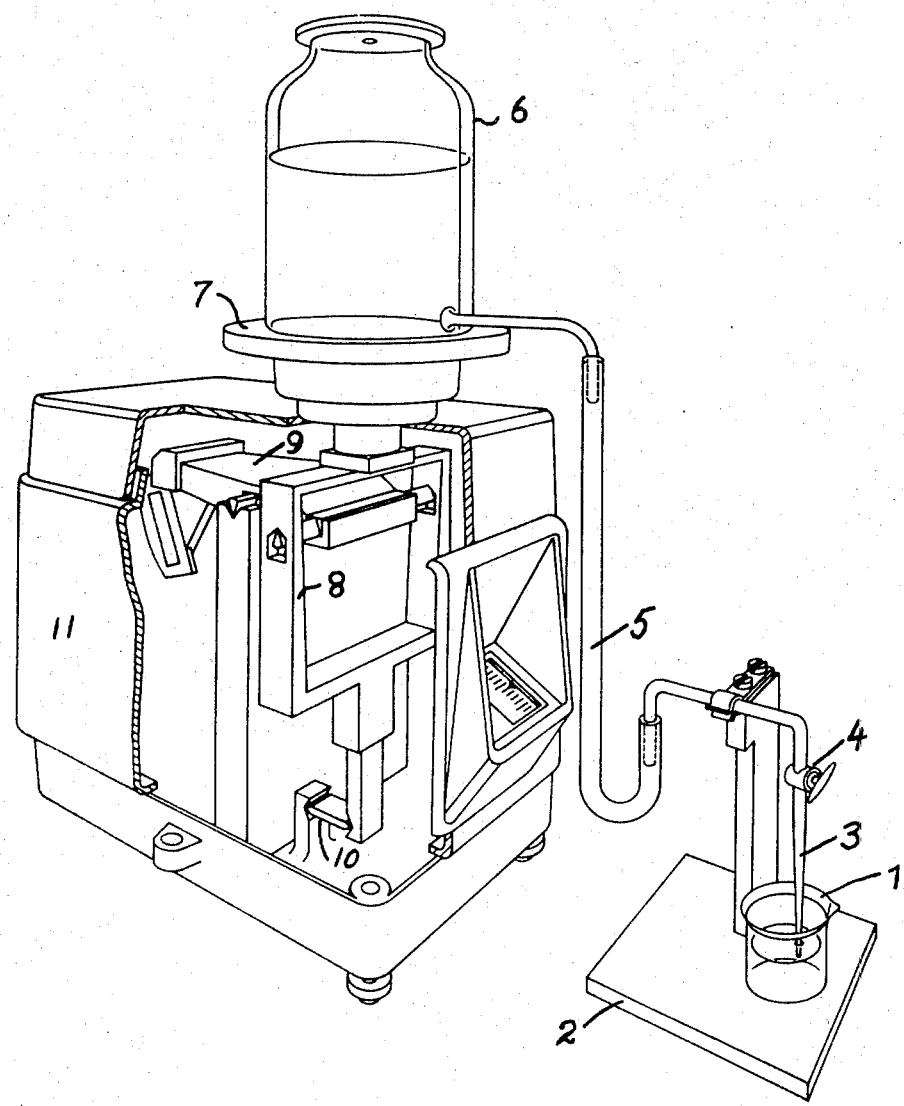
Inventor
Hans Conrad Jucker
By Pierce, Scheffler & Parker
Attorneys United States Patent Office 3,438,736
Patented Apr. 15, 1969

3,438,736
GRAVIMETRIC TITRATION PROCESS AND
APPARATUS THEREFOR
Hans Conrad Jucker, Kusnacht, Switzerland, assignor to
Mepag A.G., Zollikon, Switzerland, a corporation of
Switzerland
Filed Apr. 13, 1966, Ser. No. 542,436
Claims priority, application Switzerland, June 22, 1965,
8,717/65
Int. Cl. G01n *31/16, 5/00*
U.S. Cl. 23—230                                    4 Claims This invention relates to a gravimetric titration process and apparatus for use in such a process.

In the gravimetric titration process a normal solution is used for titration and its composition is expressed in units of mass or weight. The amount used in titration is ascertained from a difference in mass or weight and obtained by suitable weighing operations. The method of gravimetric titration process most commonly used at present has the titration vessel receiving the liquid to be titrated and any accessories such as agitators, measuring sensors and electrodes kept in a fixed position. Only the burette receiving the reagent solution has to be mounted for easy removal. What is measured is the reduction in weight or mass experienced by the reagent solution contained in the burette. For this purpose the burette and its contents are placed on the scale pan of a balance and weighed before the beginning and after the end of the titration process. But during the titration the burette is lifted off the scale pan and placed in the titration apparatus in such a way that the tip of the burette dips into the liquid to be titrated.

However, the advantages of such a gravimetric titration process are matched by some predominantly practical defects. Firstly, it is laborious to have to mount and dismantle the burette possibly several times during one titration. Attempts to automate titration meet with considerable difficulties, particularly in the case of microtitration. And finally no systematic dosing can be carried out.

The present invention accordingly concerns a gravimetric titration process, wherein the deficiencies of the known method outlined above are eliminated to a very considerable extent and wherein the titration is reproduceable down to a fraction of the weight of a drop of liquid.

According to the invention there is provided a gravimetric titration process in which a reagent solution is fed to a titration vessel through a discharge nozzle which is held stationary relative to said titration vessel throughout the titration, and in which said reagent solution is fed to said nozzle from a reservoir vessel supported throughout the titration on a balance so that the weight of solution discharged to the titration vessel may be continuously measured. An apparatus for carrying out the process of the invention comprises a titration vessel, a feed nozzle adapted to be secured in a fixed position relative to said titration vessel throughout the titration, a reservoir vessel for a reagent solution, feed means continuously connecting said reservoir vessel to said feed nozzle for the conveyance of reagent solution from said reservoir vessel through said nozzle to said titration vessel, and a balance having a balance pan adapted to support said reservoir vessel throughout the titration for the continuous measurement of the weight of reagent solution discharged to said titration vessel during the titration. Said feed means may take the form of a thin flexible feed pipe connecting the reservoir vessel to the discharge nozzle. Further, the balance used is preferably a precision balance having a scale pan fastened to the upper end of a pan carrier which in turn is pivoted on a balance beam and is adapted to have a parallelogrammatic motion by means of a steering lever.

The apparatus is illustrated in the accompanying drawing which is a perspective view with a portion of the outer housing broken away to reveal the interior.

Referring to the drawing 1 is the titration vessel containing the liquid to be titrated, 2 is the stationary support for the titration vessel, 3 is the feed nozzle stationarily supported by the support 2, 4 is a valve controlling the flow of liquid through the feed nozzle 3 and 5 is a flexible tube leading from the vessel 6 containing the reagent solution to the feed nozzle 3. The reagent vessel 6 rests upon the balance pan 7. The pan 7 is supported upon the upper end of the pan carrier 8 which rests on one end of scale beam 9 which is supported for parallelogrammatic motion by a guiding lever 10. 11 is the scale housing.

As usual, any accessories such as agitators, measuring sensors and electrodes may be kept in a fixed position and appropriate clamping means may be provided.

Obviously, the apparatus according to the invention and outlined above ensures that the weight or mass of reagent solution leaving the discharge nozzle is indicated continuously by means of the balance. It is also possible to use systematic dosing and any method of indicating the end point of the titration. Moreover, the titration may be automated and optimum accuracy obtained from the precision balance according to the sensitivity used. Using the above described apparatus, the titration is easily reproduceable down to a small fraction of the weight of a drop of liquid.

These and other modifications and advantages which may occur to those familiar with the art fall within the spirit and scope of the invention as set forth in the following claims.

I claim:
1. A gravimetric titration process in which a reagent solution is fed to a titration vessel through a discharge nozzle which is held stationary relative to said titration vessel throughout the titration, and in which said reagent solution is fed to said nozzle from a reservoir supported throughout the titration on the scale pan of a balance so that the weight of solution discharged to the titration vessel may be continuously measured.

2. A gravimetric titration apparatus comprising a titration vessel, a discharge nozzle adapted to be secured in a fixed position relative to said titration vessel throughout the titration, a reservoir vessel for a reagent solution, feed means continuously connecting said reservoir vessel to said discharge nozzle for conveyance of reagent solution from said reservoir vessel through said nozzle to said titration vessel, and a balance having a scale pan adapted to support said reservoir vessel throughout the titration for the continuous measurement of the weight of reagent solution discharged to said titration vessel during the titration.

3. The invention as recited in claim 2, wherein said feed means comprises a thin flexible feed pipe connecting said reservoir vessel to said discharge nozzle for supply of reagent solution thereto.

4. The invention as recited in claim 2, wherein said balance has a scale pan fastened to the upper end of a pan carrier which in turn is pivoted on the balance beam and is adapted to have a parallelogrammatic motion by means of a steering lever.

References Cited

Kolthoff et al.: Textbook of Quantitative Inorganic Analysis, pp. 542–3 (1947).

MORRIS O. WOLK, *Primary Examiner.*

E. A. KATZ, *Assistant Examiner.*

U.S. Cl. X.R.

23—253